US005433980A

United States Patent [19]

Auld et al.

[11] Patent Number: 5,433,980

[45] Date of Patent: Jul. 18, 1995

[54] PRESERVED PORTRAITS AND PHOTOGRAPHS AND METHOD FOR MAKING SAME

[75] Inventors: Daniel L. Auld, Columbus; Michael W. Kaumeyer, Lancaster, both of Ohio

[73] Assignee: The Auld Company, Columbus, Ohio

[21] Appl. No.: 259,005

[22] Filed: Jun. 13, 1994

[51] Int. Cl.[6] .................... B32B 9/00

[52] U.S. Cl. .................... 428/13; 428/14; 428/28; 428/67; 428/68; 428/76; 428/174; 428/187; 428/195; 428/542.2; 428/913

[58] Field of Search .................... 428/195, 913, 914, 207, 428/204, 67, 68, 70, 76, 84, 88, 96, 13, 14, 28, 174, 542.2, 187

[56] References Cited

U.S. PATENT DOCUMENTS

| | | | |
|---|---|---|---|
| 4,259,388 | 3/1981 | Reed | 428/174 |
| 4,356,617 | 11/1982 | Coscia | 428/195 |
| 4,356,617 | 11/1982 | Coscia | 29/527.4 |
| 4,446,179 | 5/1984 | Waugh | 428/39 |
| 4,446,779 | 6/1984 | Waugh | 428/31 |
| 4,556,588 | 12/1985 | Rockwood | 428/31 |
| 4,560,596 | 12/1985 | Coscia | 428/31 |
| 4,566,926 | 1/1986 | Waugh | 156/242 |
| 4,566,929 | 1/1986 | Waugh | 156/242 |
| 4,801,479 | 1/1983 | Fielder et al. | 428/31 |
| 4,877,657 | 10/1989 | Yaver | 428/31 |
| 4,929,591 | 6/1990 | Egashira et al. | 428/195 |
| 5,246,910 | 9/1993 | Koshizuka et al. | 428/212 |
| 5,309,659 | 5/1994 | Eastman | 40/600 |

*Primary Examiner*—Patrick J. Ryan
*Assistant Examiner*—Abraham Bahta
*Attorney, Agent, or Firm*—Killworth, Gottman, Hagan & Schaeff

[57] ABSTRACT

Preserved portraits or photographs and a method for making the same are provided. Paper substrates with portrait or photographic images are ideally preserved against the effects of sunlight, moisture and age by the method of the present invention. A plastic cap is cast upon at least one surface of the article and cured thereon. The plastic cap becomes integral to the surface of the substrate and acts to enhance the clarity and quality of the portrait or photographic image disposed on the substrate surface. Preferably, a backing layer is also provided on the substrate. More preferably, the backing layer comprises a magnetized layer allowing the preserved article to be displayed on metallic objects.

10 Claims, 1 Drawing Sheet

PRESERVED PORTRAITS AND PHOTOGRAPHS AND METHOD FOR MAKING SAME

BACKGROUND OF THE INVENTION

The present invention relates generally to preserved portraits and photographs and a method for making the same. More specifically, the present invention relates to portraits and photographs on paper substrates preserved by the application of an integral lens cap of a clear plastic material.

Pictures such as portraits and photographs are generally displayed on paper substrates such, as for example cotton bond or photography development paper. These substrates all have several undesirable characteristics such as the potential to fade or discolor with prolonged exposure to light or age, becoming brittle upon aging, potential damage after exposure to moisture and the susceptibility of the surface to scratch, crack or tear. Thus, there has long been a desire to preserve the surface of portraits and photographs for archival storage or display. The traditional and most common means for preserving has been to place them behind either glass sheet or plastic sheeting in a photo album. Glass is effective for preventing physical damage such as scratching or tearing. However, glass has several significant drawbacks. Most importantly, glass is incapable of filtering damaging rays of light, such as ultraviolet light. Also, glass is extremely fragile and hazardous if broken. Further, glass cannot prevent exposure to potentially damaging moisture and cannot cover imperfections in the surface. As for plastic sheeting in a photo album, such preservation is not permanent. The sheeting can become torn or damaged thereby reducing its effectiveness.

More recently, preservation methods have been developed involving lamination processes. In general, these methods involve compressing a substrate to be preserved between two plastic based sheets. Lamination further requires the use of an adhesive to bond the layers together and the application of heat to enhance the bonding of the adhesive. However, lamination also has several significant drawbacks. Lamination, as mentioned requires an adhesive to bond the layers. The presence of an adhesive detracts from the colors on the substrate making the image appear dull or blurry. Further, lamination uses the application of intense heat which may damage some heat sensitive substrates. Also, laminated coatings are not generally flexible and can scratch, break or tear with age.

The use of urethane lens caps has been previously disclosed in the arena of decorative emblems. U.S. Pat. No. 4,446,179 to Waugh, U.S. Pat. No. 4,566,929 also to Waugh, U.S. Pat. No. 4,560,596 to Coscia and U.S. Pat. No. 4,801,479 to Fielder et al, disclose decorative emblems with urethane coatings. The decorative emblems all involve metal foil or plastic foil based substrates. The use of paper or paper-like substrates is not disclosed or taught. The primary purpose of the decorative emblems was intended for applications in the automotive industry, as trim strips or decorative plaques and emblems; not for the preservation of pictures.

Accordingly, there remains a need for the archival preservation of portraits and photographs such that damage from light exposure, moisture, tearing, scratching or the like is minimized without the degradation of the color or clarity of the image on the paper substrate.

SUMMARY OF THE INVENTION

The present invention solves this need by providing preserved portraits and photographs and a method for making the same. More particularly, the present invention comprises a paper substrate, such as photography paper, having a portrait or photographic image thereon, and having an integral plastic lens cap cast thereover. The integral lens cap provides protection to the substrate and portrait or photograph image thereon from prolonged exposure to light and moisture. The integral lens cap also prevents the occurrence of scratching, breaking or tearing to the paper substrate, as well as, filing in pits and inconsistencies on the substrates surface.

In accordance with the present invention, a preserved portrait or photographs is provided. The article comprises a paper substrate with an integral lens cap on the substrate. The substrate has a portrait or photographic image on at least one surface of the substrate. Preferably, the substrate has substantially flat top and bottom surfaces with the portrait or photographic image being on tile top surface. Ideally, the substrate is photography paper with a photographic image on the paper.

The lens cap is integral to the surface of the substrate. In other words, there are no adhesives or intervening layers between the plastic lens cap and the substrate surface. Rather, the plastic lens cap of the present invention is cast directly onto the surface as a fluent liquid then cured. As a result, the lens cap is integral to the substrate surface. The plastic employed is preferably a clear, flexible, abrasion-resistant polyurethane and preferably includes a UV absorbing compound.

The bottom surface of the substrate may also have a plastic lens cap cast on and integral thereto. However, preferably, there is a backing material attached to the bottom surface. Ideally, the backing material is a magnetic layer. Further, the backing material is preferably attached to the bottom layer with an adhesive layer.

In accordance with an additional aspect of the present invention, a method for preserving portraits or photographs of the present invention is provided. The method comprises the steps of providing a paper substrate. The substrate has a portrait or photographic image on at least one surface. Preferably, the substrate has a substantially flat portrait or photographic image containing top surface and a substantially flat bottom surface. Ideally, the substrate is photography paper.

The method next includes the steps of providing an effective edge on the at least one portrait or photographic image containing surface. The effective edge is preferably a sharp or clean cut edge. This allows the lens effect of the lens cap to be formed. Surface tension between the fluent plastic composition and the edge allow a positive meniscus to form at the edge.

After the effective edge is formed the plastic lens cap is cured. The lens cap is formed by casting a fluent plastic composition from a casting head onto the portrait or photographic image containing surface. While the lens cap is being cast, the substrate is held substantially flat so that the plastic composition flows to the effective edge and forms a positive meniscus. The plastic composition is preferably a clear, flexible, abrasion-resistant polyurethane. The fluent composition is then allowed to cure, completing the formation of the lens cap.

The method also includes the steps of applying a backing to the bottom layer if one is desired. The backing layer may be applied with an adhesive layer to hold the backing in place. Preferably, the backing layer is a magnetic material. If so desired, the backing layer may be omitted and a lens cap similar to the lens cap on the top surface may be applied to the bottom surface, or some other protective, encapsulating coating or layer applied.

Accordingly, it is an object of the present invention to preserve portraits or photographs. It is a feature of the present invention to provide preserved portraits or photographs with an integral, plastic lens cap. It is still further a feature of the present invention to provide a method for preserving portraits or photographs comprising casting an integral lens cap on the paper substrate. It is an advantage of the present invention that portraits or photographs are provided with improved properties of protection from exposure to light and moisture, tear and scratch resistance, as well as improved image quality. Other objects and advantages of the present invention will be apparent from the following description, the accompanying figures, and the claims.

DETAILED DESCRIPTION OF THE PREFERRED EMBODIMENTS

The present invention comprises preserved portraits or photographs and a method for making the same. The preservation is accomplished by the casting of an integral lens cap on the surface. The lens cap not only preserves the surface of the substrate but actually enhances the appearance of the portrait or photographic image as viewed through the lens cap. The present invention and its attendant advantages will be further described by reference to the accompanying figures.

Figure 1:
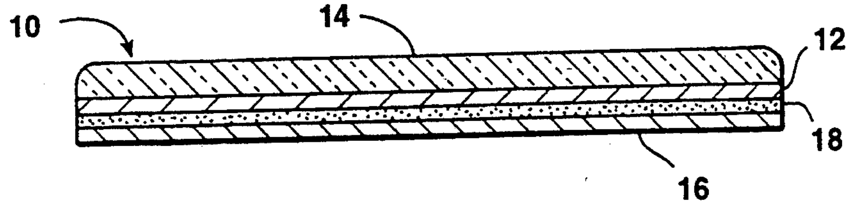
FIG. 1 is a cross-sectional view of the preserved portrait or photograph of the present invention.
Figure 2:
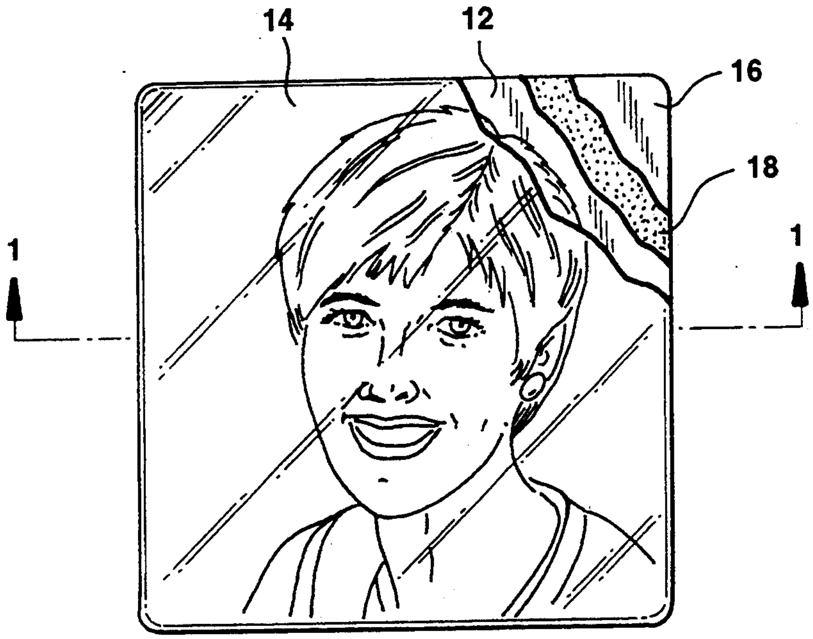
FIG. 2 is a perspective cut-away view of the top of a preserved portrait or photograph of the present invention.

Referring to FIG. 1 where dimensions are exaggerated for clarity, there is seen a cross-sectional view of the preserved portrait or photograph 10 of the present invention. The preserved portrait or photograph 10 comprises a substrate 12 and a plastic lens cap 14. Substrate 12 is a paper substrate having a portrait or photographic image on at least one surface of the substrate, as can be seen in FIG. 2, a cut away perspective view of the present invention. The paper substrates of the present invention can include most paper or paper-like articles, such as, for example, most cotton bonds, vellum, parchment, onionskin, and all types of photography paper including polyethylene based photography paper. The portrait or photographic image on the surface of substrate 12 can be most any representation. Generally, the substrate 12 is approximately 10 thousands of an inch in thickness.

The plastic lens cap 14 is a flexible plastic material which is weather-resistant and does not yellow or cloud as a result of prolonged exposure to light and which withstands strong detergent. The plastic should also be resistant to abrasion, impact, scratching and tearing. A number of plastics may be used for this purpose, but one which is particularly advantageous because it satisfies all the above needs is an impact and abrasion resistant, clear, flexible polyurethane. One polyurethane useful in the present invention is the reaction product of polypropylene glycol and an aliphatic diisocyanate.

In one embodiment, a relatively soft, flexible, water-resistant polyurethane generally characterized by a Shore A hardness in the range of approximately 75 to approximately 95 and preferably approximately 85 to approximately 95, a specific gravity in the range of approximately 1.02 to approximately 1.08, preferably approximately 1.06, and a gel time in the range of approximately 4 to approximately 7 minutes, preferably approximately 5 minutes is used. Such polyurethanes are known and various ones can be used in the present invention. One that is particularly useful is the reaction product of (A) a mixture of a polyester glycol and low to medium molecular weight polypropylenetriols and (B) an aliphatic diisocyanatepolypropylenetriol adduct.

Preferably, a suitable catalyst is added to the "A" component to aid in curing. The catalyst added is generally a heavy metal catalyst such as zinc, lead, tin, mercury, bismuth or combinations thereof. The addition of the catalyst promotes a slow cure at room temperature so as to allow full flow of the liquid polyurethane to the edges of the substrate before setting.

An important advantage of the present invention is the ability of the integral lens cap to protect the substrate from the harmful effects of sunlight and specifically UV radiation. Although the plastic lens cap by itself will repel an amount of UV radiation thereby prolonging the life of the substrate surface, preferably a UV absorbing compound is added to component "A" of the reaction mixture. The presence of a UV absorber further reduces the amount of harmful radiation which reaches the substrate surface. Suitable UV absorbers include benzothenone UV screeners. A typical benzothenone UV screener is available under the tradename TINUVUN and is available from Ceba-Geigy Corp. of Ardsly, N.Y.

Additionally, the plastic lens cap also preferably contains an antioxidant compound. An antioxidant aids in preventing the plastic lens cap from yellowing or discoloring with age and, thus, prolongs the archival storage of the substrate. Suitable antioxidants for the present invention include hindered amines. A typical hindered amine useful in the present invention is available under the tradename IRGANOX and is available from Ceba-Geigy Corp. of Ardsly, N.Y.

The plastic composition is cast onto the substrate surface as a fluent, liquid composition from a casting head. The casting head can be any known head suitable for such a purpose. Examples of a suitable casting head of the present invention include a single nozzle capable of moving in two axes so as to completely coat the substrate surface or multiple nozzles covering the entire substrate surface area. The flow of plastic composition from and location of the nozzle or nozzles, can be effected either manually or automatically operated. A suitable casting head and apparatus can be found in U.S. Pat. No. 4,356,617 to Coscia, which is herein incorporated by reference.

The plastic composition can be applied to the surface by casting, flow coating or any like means. Preferably, the plastic composition is cast by pouring from multiple nozzles and flow coated over the surface to completely coat the substrate surface to a thickness of approximately 40 to approximately 80, and preferably 60 thousandths of an inch. In the case of the preferred polyurethane material, the reactive components (i.e. the polyol component and the diisocyanate component) are typically held separate and then mixed at the casting head immediately before being cast onto the substrate surface. The reactive components are typically mixed at elevated temperatures in the range of from 90° to 120° F, preferably 105° F.

To enhance the smooth even surface appearance, the component parts of the preferred urethane should be mixed carefully in the casting head such that no air is entrapped in the composition. Entrapped air forms bubbles that will cause imperfections in the lens cap. Preferably, components "A" and "B" are degassed before mixing to ensure that air bubbles do not become entrapped. This is done by drawing a good vacuum on the material, releasing the vacuum, drawing another vacuum and releasing the vacuum again. After degassing, the components should be mixed and the composition cast within the aforementioned gel time.

The substrate 12 should be free from moisture, grease, dust and other foreign matter. The substrate 12 preferably should be held substantially flat or level. A substantially flat or level surface allows for a smooth, even distribution of plastic composition over the substrate surface. The substrate can be held flat be any suitable means, such as, for example, by means of a vacuum being created underneath substrate 12.

Before casting of the plastic composition, the edges of the substrate should preferably have a clean or sharp cut edge to create an effective edge. By effective edge it is intended to mean one that will create sufficient surface tension to create a positive meniscus effect on the edges of the substrate with the plastic composition. As the plastic composition is cast, the composition flows to the effective edge of the substrate where the surface tension forces create a positive meniscus, i.e. a curved edge. This positive meniscus at the edge provides the lens effect to the lens cap. This lens effect enhances the appearance of the portrait or photographic image on the substrate. A sharp, smooth cut is generally sufficient to create the desired effective edge.

Once cast, the plastic material is clear and increases the clarity and enhances the details of the image. As the lens cap is cast as liquid directly onto the surface of the substrate, the lens cap is integral to the substrate surface. That is, the lens cap and substrate surface form one layer. Any imperfections in the surface of the substrate are actually "filled" by the liquid plastic. There are no intermediate spaces or layers such as adhesives. Nor is the lens cap easily removable from the substrate surface. Removal of the lens cap would damage the image on the substrate. The lens cap can be tinted with various colors, but excellent results are obtained with the clear cast which contrasts with the image.

Once casting of the plastic composition is complete, the cast plastic composition is cured or otherwise hardened to form lens cap 14. Curing may be accomplished by air drying, various heating techniques, or combinations thereof. Although not required, the preferred cure technique is an initial air drying followed by heating to further cure the plastic composition. The plastic composition is allowed an initial air dry curing for approximately 10 to approximately 12 minutes. The initially cured lens cap is then subjected to a bake to further cure the composition. The bake is conducted within the range of approximately 110° F. to approximately 145° F., preferably 120° F.–140° F., for approximately 6 to approximately 12 hours, preferably approximately 8 hours.

Figure 3:
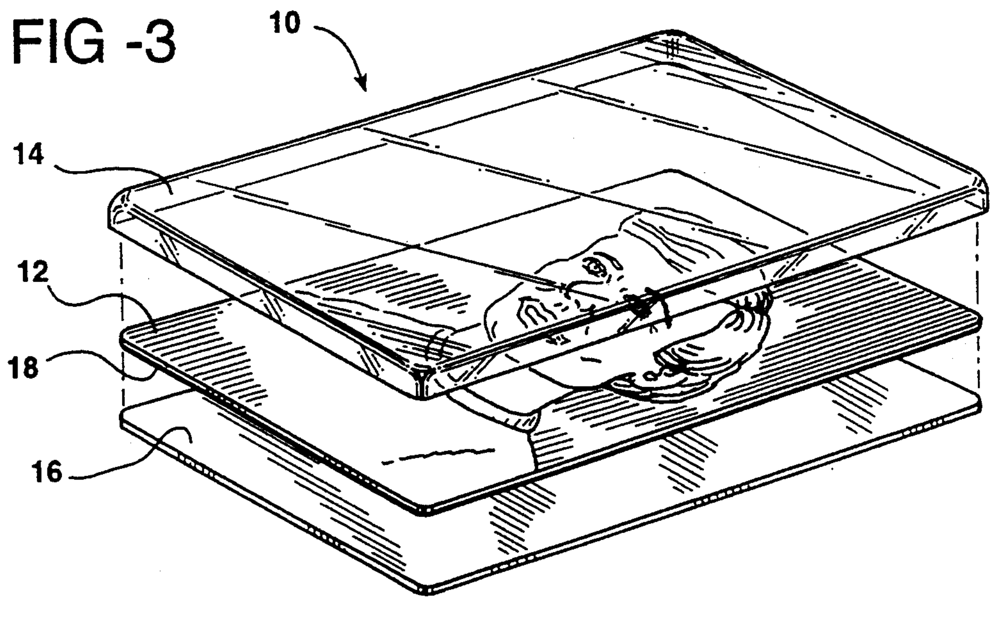
FIG. 3 is a representational view of the layers of the preserved portrait or photograph of the present invention.

Returning to FIG. 1, in the preferred embodiment of the present invention, substrate 12 has a backing layer attached to the bottom or non-image side of the substrate. Backing layer 16 provides stability and support to substrate 12. Additionally, backing layer 16 protects the bottom or non-image side of the substrate from damage that could result if the surface was exposed. Backing layer 16 can be any material suitable for the purpose of providing stability, support and protection to the substrate. Examples include, but are not limited to, magnetic sheeting, heavy paper products such as cardboard, plastic sheeting, or like materials. Ideally, backing layer 16 is a magnetic sheet. A magnetic sheeting backing layer allows the preserved portrait or photograph to be attached to any metallic objects, such as a refrigerator or filing cabinet, for display. Again while dimensions are exaggerated for clarity, a representational view of backing layer 16 and the preserved portrait or photograph 10 of the present invention is shown in FIG. 3.

Backing layer 16 is secured to substrate 12 by means of a suitable adhesive. Adhesive layer 18 is disposed between backing layer 16 and substrate 12. Adhesive layer 18 may be any adhesive suitable for the purpose of securing backing layer 16 to substrate 12. Examples of suitable adhesives include any rubber-based pressure sensitive adhesive. Preferably, adhesive layer 18 is approximately 1 to approximately 4, preferably 2 mils thick. Preferably, the adhesive layer is pre-applied to the backing material and protected with a liner. This allows for ease and speed when applying the magnetic layer during preservation of a substrate. The substrate is applied to the adhesive coated backing layer then heat pressed to assure a secure bond.

In an additional embodiment of the present invention, a lens cap 14 can be cast onto the bottom surface or another type of transparent protective coating or layer applied in lieu of backing layer 16. The lens cap on the bottom surface is cast after the lens cap on the first portrait or photographic image containing surface has been at least partially cured. Further, if so desired, the bottom surface may also contain a portrait or photographic image.

In the application of a lens cap to both top and bottom surfaces, preferably the lens cap on one surface is cast and completely cured before the application of the second lens cap. The lens cap on the second surface is then cast and subjected to its own complete cure. If the lens cap on the first surface is not sufficiently cured before the second lens cap is cast, the lens cap on the first surface may be marked or indented during casting of the second.

The present invention is ideally suited for the preservation of photographs and portraits. The lens cap of the present invention protects the photograph or portrait from the harmful effects of light and age. The lens cap also imparts a tear and scratch-resistant surface. It makes somewhat flexible photographs, which might otherwise crack when flexed. Further, the lens cap covers imperfections on the surface of the photograph or portrait and as a result actually enhances the quality of the portrait or photographic image.

The method of the present invention will now be illustrated by reference to the following example. The method is not intended to be limited to the specific, exemplary materials, but rather, may be practiced generally by the principles espoused below.

EXAMPLE

A photograph placed on standard photography paper was preserved according to the following procedure. A piece of magnetized sheeting generally equal in dimension to the photograph was provided. The liner was removed from the face of the magnetized sheeting exposing a pre-applied adhesive layer. The photograph was placed on the adhesive surface and heat pressed to securely bond the layers. A sharp edge was die cut through the photo and magnetized sheeting. Component A comprising a mixture of polyester glycol, polypropylenetriols, TINUVUN as a UV screener, IRGANOX as an antioxidant and approximately 0.01% by weight of a lead containing catalyst based on the overall weight of the final solution and component B comprising an aliphatic diisocyanate-polypropylenetriol adduct were formulated. The components were mixed at a ratio of 1:1 at 105° F. to form a polyurethane and cast upon the photo by pouring through multiple nozzles. The cast lens cap was allowed a first stage air cure for approximately 10 minutes. After the first stage cure had been completed, a second and final cure comprising a post bake of 130° F. for 8 hours was conducted. After completely curing, the preserved photo was inspected for imperfections and packed for shipment.

While certain representative embodiments and details have been shown for the purposes of illustrating the present invention, it will be apparent to those skilled in the art that various changes in the method and article disclosed herein may be made without departing from the scope of the invention, which is defined in the appended claims.

What is claimed is:

1. A preserved portrait or photograph comprising:

a paper substrate having a portrait or photographic image on at least one surface of said substrate; and, a cured plastic cap cast on and integral to said image containing surface, said cap providing a lens effect over said image containing surface, thereby enhancing the appearance of said image as viewed through said clear plastic cap.

2. The article as claimed in claim 1 wherein said plastic cap is clear, flexible abrasion-resistant polyurethane.

3. The article as claimed in 1 wherein said plastic cap contains a UV absorbing compound.

4. The article as claimed in claim 1 wherein said substrate comprises a substantially flat, top portrait or photographic image containing surface and a substantially flat bottom surface.

5. The article as claimed in claim 4 wherein said article further includes a backing layer attached to said bottom surface.

6. The article as claimed in claim 5 wherein said backing layer is attached to said bottom surface with an adhesive layer.

7. The article as claimed in claim 5 wherein said backing layer is a magnetic layer.

8. The article as claimed in claim 7 wherein said substrate is photography paper and said portrait or photographic image is a photographic image.

9. The article as claimed in claim 4 wherein said bottom surface has a cured, plastic cap cast on and integral thereto.

10. The article as claimed in claim 1 wherein said substrate is photography paper and said portrait or photographic image is a photographic image.

* * * * *